United States Patent [19]
Yoshida

[11] Patent Number: 5,315,206
[45] Date of Patent: May 24, 1994

[54] ELECTRON EMISSION ELEMENTS INTEGRATED SUBSTRATE

[75] Inventor: Yoshihiro Yoshida, Yokohama, Japan

[73] Assignee: Ricoh Company, Ltd., Tokyo, Japan

[21] Appl. No.: 837,635

[22] Filed: Feb. 13, 1992

[30] Foreign Application Priority Data

Feb. 20, 1991 [JP] Japan .................................. 3-026042

[51] Int. Cl.⁵ .................................................. H01J 1/30
[52] U.S. Cl. ..................................... 313/306; 313/309; 313/336; 313/351
[58] Field of Search ............... 313/306, 309, 336, 351, 313/355

[56] References Cited

U.S. PATENT DOCUMENTS

| | | | |
|---|---|---|---|
| 3,735,186 | 5/1973 | Klopfer et al. | 313/355 |
| 4,253,221 | 3/1981 | Cochran, Jr. et al. | 313/309 |
| 4,835,438 | 5/1989 | Baptist et al. | 313/336 |
| 5,164,632 | 11/1992 | Yoshida et al. | 313/351 |
| 5,194,780 | 3/1993 | Meyer | 313/309 |

*Primary Examiner*—Donald J. Yusko
*Assistant Examiner*—Nimesh D. Patel
*Attorney, Agent, or Firm*—Cooper & Dunham

[57] ABSTRACT

An electron emission elements integrated substrate comprising a substrate having a plurality of minute holes formed therein. Each hole extends in a direction of thickness of the substrate. An electron emission element is arranged in the each hole. The element comprises a first electrode, a second electrode and an insulating member disposed between the first and second electrodes.

22 Claims, 14 Drawing Sheets

EVAPORATION

EVAPORATION

EVAPORATION ($\theta_2 > \theta_1$)

EVAPORATION

EVAPORATION ($\theta_2 < \theta_1$)

ION SHOWER
(OR SPUTTER)

EVAPORATION

ELECTRON EMISSION ELEMENTS INTEGRATED SUBSTRATE

BACKGROUND OF THE INVENTION

1. Field of the Invention

The present invention relates to an electron emission elements integrated substrate, more particularly, it relates to an electron emission elements integrated substrate which is effectively applicable to a display device having a flat display surface.

2. Description of the Related Art

A cold cathode type electron emission element has been used as an appropriate element for constituting a display device having a flat display surface which is called flat CRT (Cathode-Ray Tube).

Such an electron emission element is disclosed in, for instance, Japanese Patent Application Laying Open (KOKAI) No. 1-311534. The electron emission element disclosed in the patent document constitutes a surface conductive type electron emission element comprising a pair of electrodes and an electron emission portion of high resistance formed between the electrodes wherein in order to avoid unnecessary spread of electron emission area of the portion, the portion having predetermined minute particles is formed only in a local part between the electrodes.

The flat CRT utilizing the electron emission element mentioned above has not yet widely commercialized. In order to practically commercialize the products of the flat CRT, it is required that the display quality be heightened and that the cost thereof be reduced as well or more than that. For this purpose, it becomes necessary to even the electron emission current of the individual elements included in each pixel by raising the density of the cathodes constituting one pixel of the flat CRT so that an even luminous intensity distribution can be realized over the entire display surface of the CRT. Further, it also becomes necessary to reduce the cost of the electron emission element substrate by raising the through-put of the element production.

However, in accordance with the electron emission element of the related art mentioned above, the electron emission portion is formed by a very complicated process wherein the portion is formed in such a way that first a resist layer is coated on the area other than the electron emission portion so as to form a mask and after that an organic solvent including a palladium compound is coated over an entire surface of the substrate by a spin-coating method and after that the substrate is burned under a predetermined condition to form a discontinuous film having an island structure comprising minute particles of palladium constituting the islands and after that the resist layer is removed. Such a complicated process causes to raise the cost of the element.

Also, at the time of forming the electron emission portion at a local part between the electrodes, the portion is formed two-dimensionally on the surface of the substrate, which limits the high density integration of the electron emission portion which is caused from wiring aspect as well.

Therefore, it was difficult to realize a display device utilizing the electron emission element of high display quality with a low cost.

SUMMARY OF THE INVENTION

The present invention was made considering the above mentioned problems of the related art.

It is therefore an object of the present invention to provide an electron emission element integrated substrate which has a plurality of minute holes and a number of electron emission elements integrated therein in high density wherein the efficiency of electron emission is raised and makes it possible to realize an inexpensive display device of high display quality.

The above mentioned object of the present invention is achieved by an electron emission elements integrated substrate comprising:

a substrate having a plurality of minute holes formed therein, each hole extending in a direction of thickness of the substrate; and an electron emission element arranged in the each hole, the element comprising a first electrode, a second electrode and an insulating member disposed between the first and second electrodes.

In accordance with a first embodiment of the present invention, the substrate has a plurality of minute holes, each hole extending in the direction of thickness of the substrate, and the electron emission element is formed along the inner wall of each minute hole of the substrate.

In accordance with a second embodiment of the present invention, the substrate is constituted from a film member having a plurality of minute holes formed therein by an anodic oxidization process.

In accordance with a third embodiment of the present invention, the electron emission element is of the metal-insulator-metal type.

In accordance with a fourth embodiment of the present invention, the electron emission element comprises a plane electrode for electron emission and an electron drawing electrode.

In accordance with a fifth embodiment of the present invention, the electron emission element is of the surface conductive type.

In accordance with a sixth embodiment of the present invention, the electron emission element comprises an electron drawing electrode formed along the inner wall of the minute hole and a conical electron emission electrode formed in the vicinity of the electron drawing electrode.

In accordance with a seventh embodiment of the present invention, the electron emission element has a pin-like electron emission electrode.

In accordance with a eighth embodiment of the present invention, the electron emission electrode is patterned in the inner wall of the minute hole of the substrate.

It is an advantage of the present invention that due to the arrangement wherein the electron emission element is formed along the inner wall of the minute hole of the substrate, as realized by the first embodiment of the present invention, it becomes possible to effectively use an entire surface of the substrate for wiring, which makes it possible to realize a high integrated substrate.

It is another advantage of the present invention that due to the arrangement wherein the substrate is made from an anodized film, as realized by the second embodiment of the present invention, it becomes possible to make the diameter of the hole very small and shorten the pitch length of the holes, which makes it possible to realize a high integrated substrate and reduce the cost thereof as well.

It is still another advantage of the present invention that due to the arrangement wherein the metal-insulator-metal type electron emission element is formed along the inner wall of the minute hole, as realized by the third embodiment of the present invention, it becomes unnecessary to use a photo-process for forming the electron emission element, which makes it possible to reduce the cost of production.

It is a further advantage of the present invention that due to the arrangement wherein the electron emission element comprises a plane electrode for electron emission and an electron drawing electrode, as realized by the fourth embodiment, it becomes possible to realize a very simplified structure of the element and reduce the cost thereof as well.

It is a still further advantage of the present invention that due to the arrangement wherein the surface conductive type electron emission element is formed along the inner wall of the minute hole, as realized by the fifth embodiment, it becomes possible to easily form the element on the inner wall of the minute hole.

It is a still further advantage of the present invention that due to the arrangement wherein the electron emission element formed along the inner wall of the minute hole comprises a conical electron emission electrode and an electron drawing electrode, as realized by the sixth embodiment, it becomes possible to form the element without using the photo-process, which makes it possible to reduce the production cost of the element.

It is a still further advantage of the present invention that due to the arrangement wherein a pin-like electrode is formed along the inner wall of the minute hole, as realized by the seventh embodiment, the electric field is concentrated around the pin, which raises the electron emission efficiency.

It is a still further advantage of the present invention that due to the arrangement wherein the electron emission electrode is patterened along the inner wall of the minute hole of the substrate, as realized by the eighth embodiment of the present invention, the electrode structure becomes very simplified and the production cost thereof becomes inexpensive as well.

Further objects and advantages of the present invention will be apparent from the following description of the preferred embodiments of the invention as illustrated in the accompanying drawings.

DESCRIPTION OF THE PREFERRED EMBODIMENTS

Preferred embodiments of the present invention are described hereinafter with reference to the drawings.

A first embodiment of the present invention is illustrated in FIGS. 1 to 6.

Figure 1:
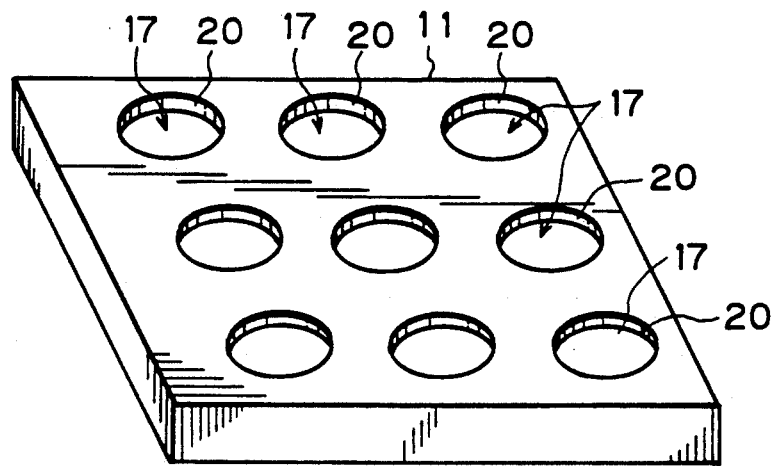
FIG. 1 is a perspective view of the electron emission elements integrated substrate in accordance with a first embodiment of the present invention.
Figure 2:
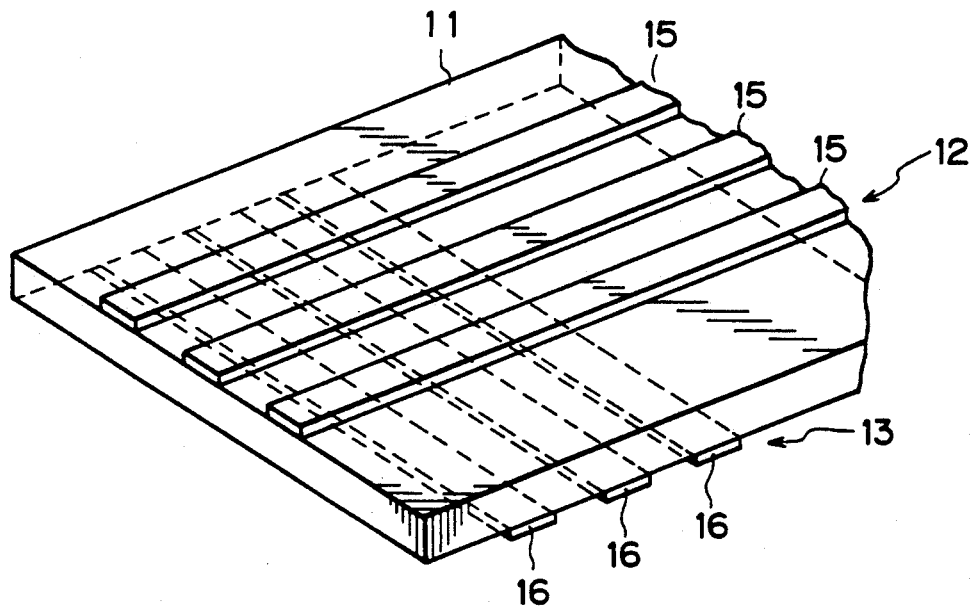
FIG. 2 is a perspective view of the common lines of the electrodes arranged in the first embodiment of the present invention.
Figure 3:
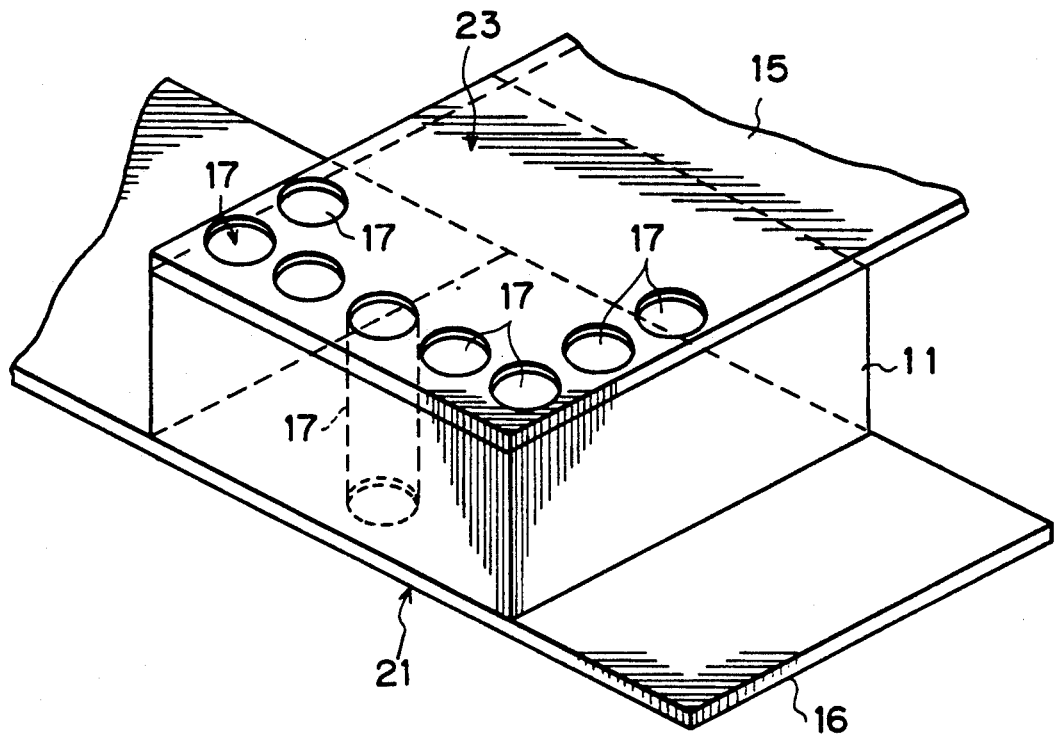
FIG. 3 is a partial enlarged perspective view of the first embodiment of the present invention.

The first embodiment of the electron emission elements integrated substrate of the present invention comprises, as illustrated in FIGS. 1 to 3, a substrate 11 composed of an anodic film made from an electrically insulating member, such as aluminum oxide ($Al_2O_3$) and wiring layers 12 and 13 disposed on the upper and lower sides of the substrate 11.

The upper wiring layer 12 comprises a plurality of electron drawing common electrode lines 15 disposed side by side separated from each other and in parallel to each other and made from, for example, gold (Au).

The lower wiring layer 13 comprises a plurality of electron emission common electrode lines 16 disposed side by side separated from each other and in parallel to each other and perpendicular to the electrode lines 15 of the upper layer 12. And the layer 13 is made from aluminum (Al), for instance.

Also, as illustrated in FIG. 3, the upper electrode 15 having a predetermined width crosses over the lower electrode 16 having a predetermined width so that a predetermined area of the substrate 11 is sandwiched by the electrodes 15 and 16 from the upper and lower sides thereof. In the cross over area, a plurality of minute holes 17 are formed penetrating through the sandwich structure made from the upper and lower electrodes 15 and 16 and the substrate 11 in the direction of thickness of the substrate 11 (vertical direction in the drawing). On the inner wall of each hole 17, an electron emission element is formed as described later.

Figure 4:
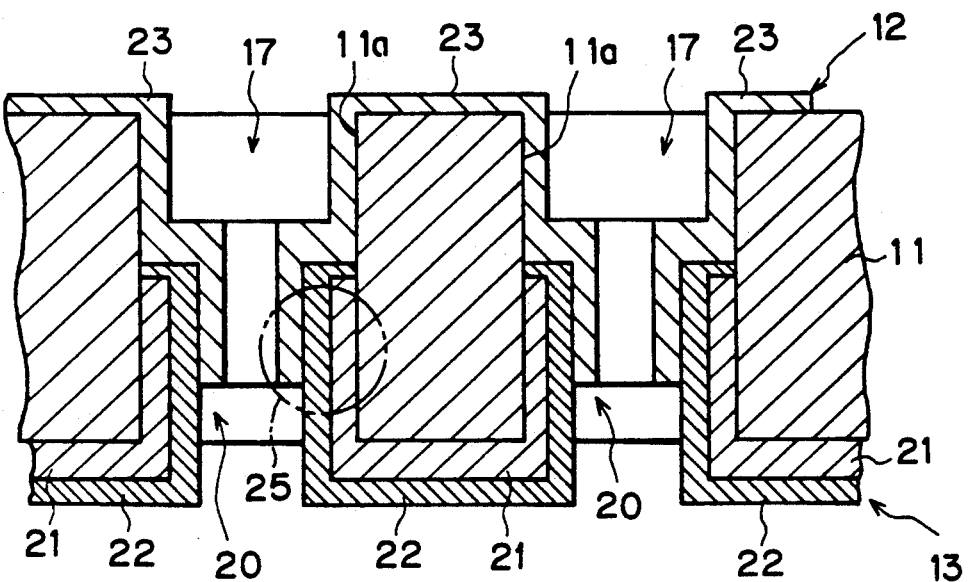
FIG. 4 is a partial enlarged sectional view of the first embodiment of the present invention.
Figure 5:
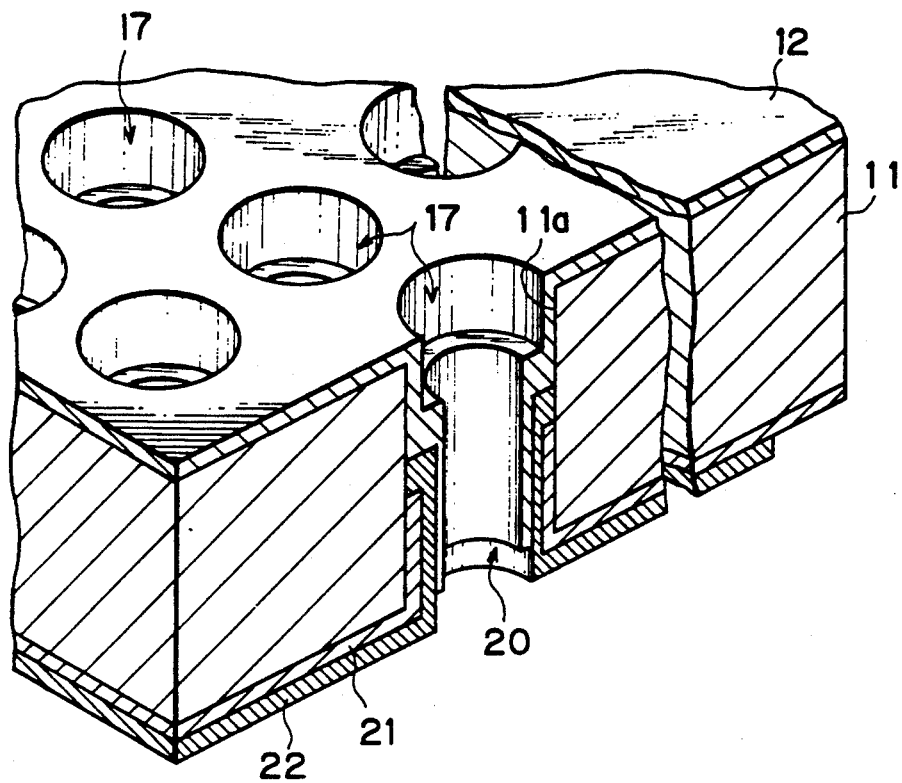
FIG. 5 is a partial enlarged perspective view of the electron emission element of the first embodiment of the present invention.

As illustrated in FIGS. 4 and 5, an electrode emission element 20 is formed in each minute hole 17. The element 20 comprises an electron emission electrode 21 made from aluminum (Al), for instance, and extending from the lower common electrode line 16 toward the upper common electrode line 15 side along the inner wall of the through-hole 11a of the substrate 11, an insulating layer 22 made from aluminum oxide ($Al_2O_3$), for instance, covering the electrode 21 formed in the lower side of the substrate 11, and an electron drawing electrode 23 made from gold (Au), for instance, extending from the upper common electrode line 15 toward the lower common electrode line 16 side along the inner wall of the through-hole 11a of the substrate 11. The insulating layer 22 is thin (10 nm thick or less, for instance) and disposed between the electrodes 21 and 23 in the hole 17 to constitute a electron emission portion 25 having an electrically high resistance to emit electrons.

It is to be noted that although in the drawings the boundary portions between the substrate 11, the electrodes 21 and 23 and the insulating layer 22 and the corner portions thereof as well are depicted sharply, those portions are gentle or rounded actually.

It is also to be noted that the sandwich structure made from the electrodes 21 and 23 and the insulating layer 22 may be formed only at a part of the inside wall of the hole 17 along the inner periphery of the hole 17.

Next, a process for producing the above mentioned first embodiment of the present invention is described below.

First, the substrate 11 is formed in such a way that an aluminum plate is anodized in an acid solution by an electrolysis process using the aluminum plate as the anode to form an anodized film thereon of a predetermined thickness which can be adjustable within a range from 1 to 300 $\mu$m. In accordance with an example of the anodic oxidization process, the aluminum plate is processed in a phosphoric acid solution of 4M (mol) at a temperature of 20° C. with a voltage of 160V being applied or otherwise in a sulfuric acid solution of 10% at a temperature of 20° C. with a voltage of 20V being applied.

After that, the so called barrier layer is thinned by a current restoration method. After that, the polarity of the electrolysis process is reversed and the voltage is gradually raised so that hydrogen gas is generated due to the pressure of which the anodized film is forced upward to be separated from the aluminum base plate and float in the solution. By the separation of the anodized film from the base plate, the bottom portion of each hole is removed so that a through-hole 11a is formed, whereby the substrate 11 can obtained from the anodized film having a plurality of minute through-holes 11a. After that, as mentioned above, the substrate 11 is bathed in the phosphoric acid solution to widen the diameter of the through-hole 11a to about 0.3 $\mu$m.

Figure 6:
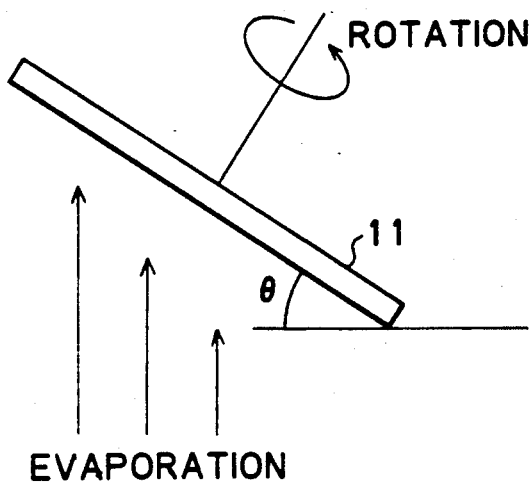
FIG. 6 is an explanatory view for explaining a process for forming the electrode of the electron emission element of the first embodiment of the present invention.

After that, the substrate 11 is rotated in an angle $\theta$, as illustrated in FIG. 6. In this state, the common electrode lines 15 is formed on one surface of the substrate 11 by an evaporation method of aluminum as well as an aluminum film of about 0.05 $\mu$m thick is simultaneously formed all around the inside wall of the through-hole 11a by the evaporation process. In such a way, the electron emission electrode 21 is formed on the substrate.

After that, the substrate 11 is bathed in boric acid solution to anodize the electron emission electrode applying a voltage of less than 10V to form the insulating layer 22.

After that, the substrate 11 is turned over upside down from the state where the aluminum film is formed thereon, as mentioned above. In this state wherein the substrate 11 is inclined by the angle $\theta$ and rotated, as illustrated in FIG. 6, a gold (Au) film of about 8 to 30 nm thick is formed all around the inside wall of the hole 11a in the other side (the side opposite to the side where the aluminum film is formed by evaporation) of the substrate 11 by an evaporation process of gold. Thereby, the electron drawing electrodes 23 are formed on the substrate 11.

It is to be noted that the above mentioned evaporation process may be conducted under the state where the inclined substrate 11 is not rotated so that the electrode 21 or 23 is formed only a part of the inner wall of the hole 17 along the inner periphery of the hole.

It is also to be noted that the minute holes 17 may be formed by a photo-process in an insulating substrate made from any insulating material to form a variation of the substrate 11.

As mentioned above, in accordance with the first embodiment of the present invention, the electron emission element 20 is formed along the inner wall of each of the plurality of minute holes 17 formed in the substrate 11, which makes it possible to use almost an entire surface of the substrate for wiring arrangement so that a high integrated structure can be obtained.

Also, the substrate 11 is made by an anodic oxidization process, which makes it possible to obtain minute holes 17 of very small inner diameter and disposed at a very small pitch in high density so that a high integrated structure can be achieved and the cost thereof can be reduced as well.

Further, in accordance with the embodiment mentioned above, the electron emission element 20 is of the MIM type (Metal Insulator Metal type) composed of aluminum, aluminum oxide and gold, which makes it possible to produce the electron emission device without using the photo-process (for example, for masking the substrate by coating with resist over the portion other than the electron emission area), thus reducing the cost for producing the substrate.

A second embodiment of the present invention is illustrated in FIGS. 7 to 17.

It is to be noted that the same or corresponding parts are designated by the same numerals as the first embodiment mentioned above and the explanation thereof is deleted.

Figure 7:
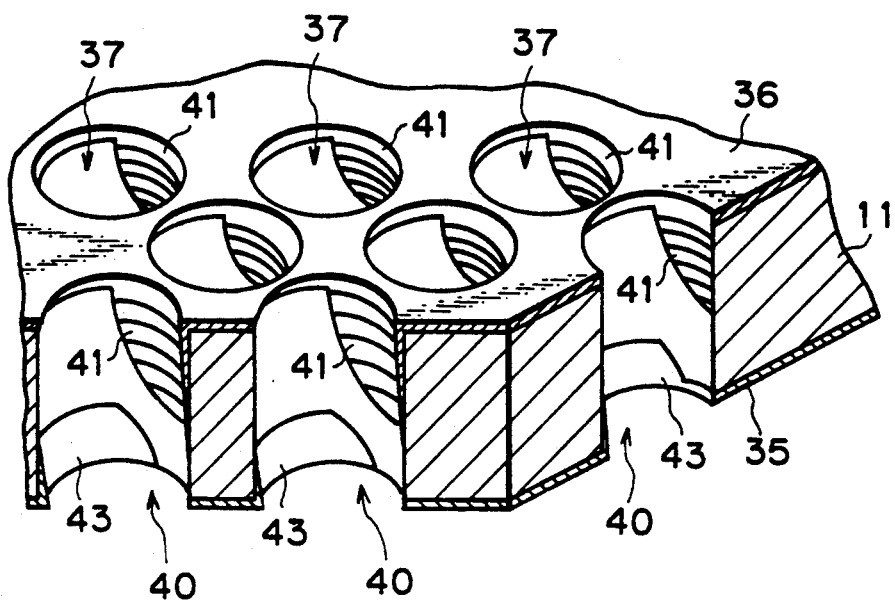
FIG. 7 is an explanatory perspective view of a main portion of the electron emission elements integrated substrate in accordance with the second embodiment of the present invention, representing the substrate arranged so that the electron emission electrode side is disposed in the upper side thereof.
Figure 8:
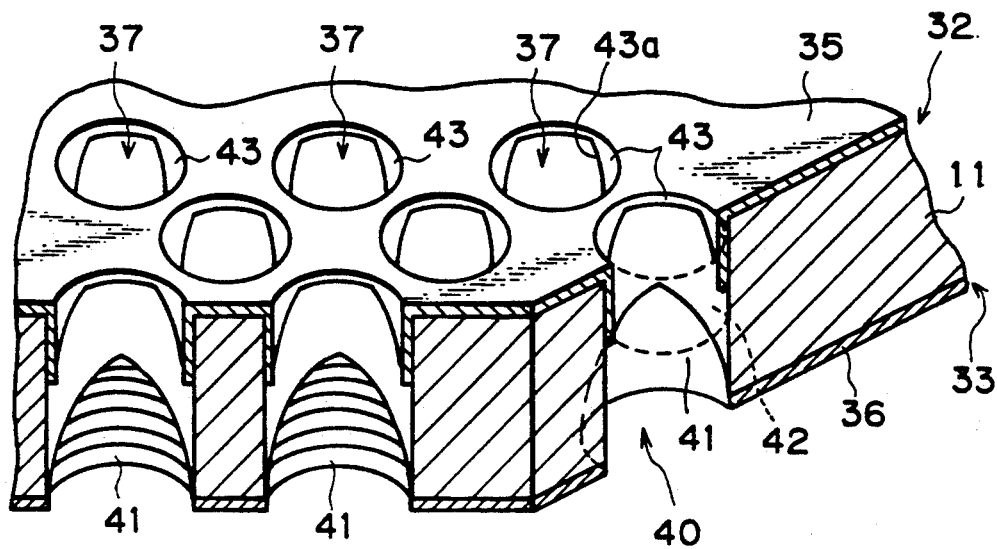
FIG. 8 is a perspective view of the second embodiment of the present invention arranged so that the electron drawing electrode side is disposed in the upper side of the substrate.

The electron emission elements integrated substrate in accordance with the second embodiment of the present invention comprises, as illustrated in FIGS. 7 and 8, a substrate 11 and two wiring layers 32 and 33 disposed on both of the upper and lower sides of the substrate in substantially the same manner as the wiring layers 12 and 13 of the first embodiment.

The upper wiring layer 32 (upper side in FIG. 8) is made from gold (Au) or aluminum (Al), for example. The layer 32 comprises a plurality of electron drawing common electrode lines 35 disposed side by side separated from each other and in parallel to each other.

Also, the lower wiring layer 33 (lower side in FIG. 8) is made from tungsten, for example. The layer 33 comprises a plurality of electron emission common electrode lines 36 disposed side by side separated from each other and in parallel to each other and perpendicular to the lines 35.

Further, each of the lines 35 and 36 has a predetermined width so that a predetermined area of the line 35 crosses over the line 36 sandwiching the substrate 11 between the lines 35 and 36. A plurality of minute holes 37 are formed in the sandwiching portion penetrating through the lines 35 and 36 and the substrate 11 in the direction of the thickness of the substrate 11.

At a part of the inner wall of each minute hole 37, a plane electrode emission element for emitting electrons is formed as described later.

Figure 9:
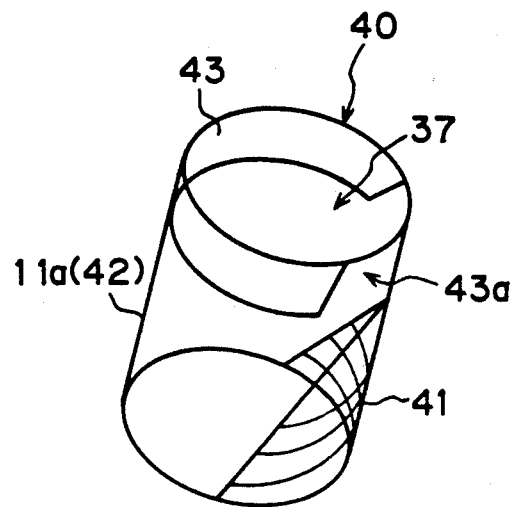
FIG. 9 is a perspective view seeing through the minute hole of the substrate in accordance with the second embodiment of the present invention.
Figure 10:
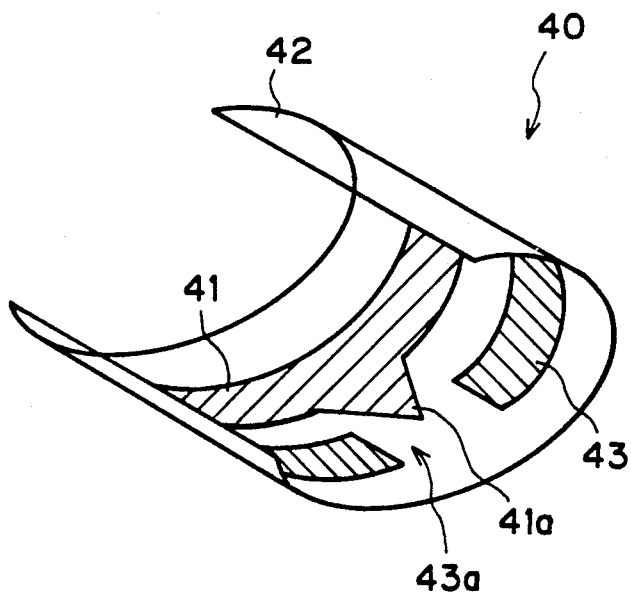
FIG. 10 is a perspective view of an example of the plane electron emission element formed on the inner wall of the hole of the second embodiment of the present invention.

As illustrated in FIGS. 9 and 10, each electron emission element 40 is formed along the inner wall of the hole 37. The element 40 comprises an electron emission electrode 41, an electron drawing electrode 43 and an insulation layer 42.

The electrode 41 is made from tungsten, for instance, and has a protruding portion 41a extending from the line 36 toward the line 35 along the through-hole 11a of the substrate 11.

The electrode 43 is made from gold (Au) or aluminum (Al), for instance, and extends from the line 35 toward the line 36 along the through-hole 11a of the substrate 11 forming an opening at a part of the inner periphery of the hole 11a for constituting an outlet 43a for emitting the electrons.

The insulation layer 42 is made from a film of alumina ($Al_2O_3$) and holds the electrodes 41 and 43. The layer 42 is formed as a part of the inner wall of the substrate hole itself.

Figure 11:
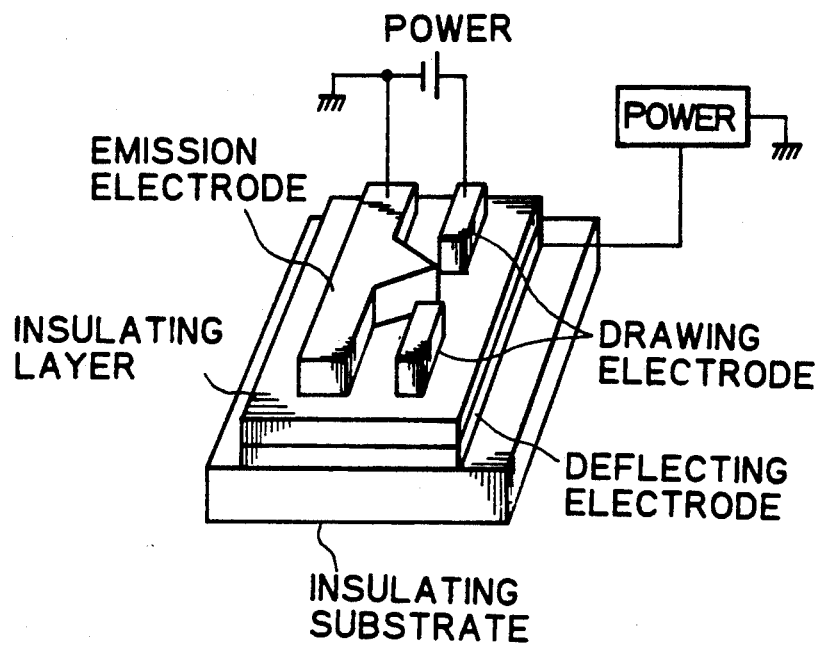
FIG. 11 is an explanatory view for explaining the function of the plane element of the second embodiment of the present invention.

That is, the element 40 is made from an essential structure of plane electron emission arrangement as illustrated in FIG. 11. The element 40 is formed by rolling the structure of FIG. 11 as illustrated in FIG. 10. In accordance with the plane electrode type element 40 mentioned above, electrons are emitted from the element in a direction perpendicular to the substrate surface.

Figure 12:
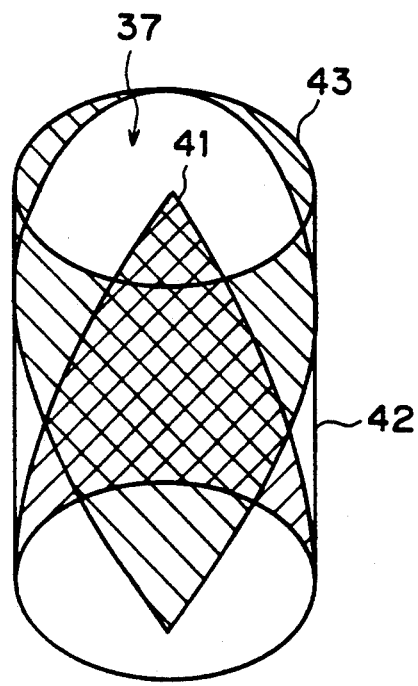
FIG. 12 is a perspective view of another example of the plane electron emission element formed on the inner wall of the hole of the second embodiment of the invention.
Figure 13:
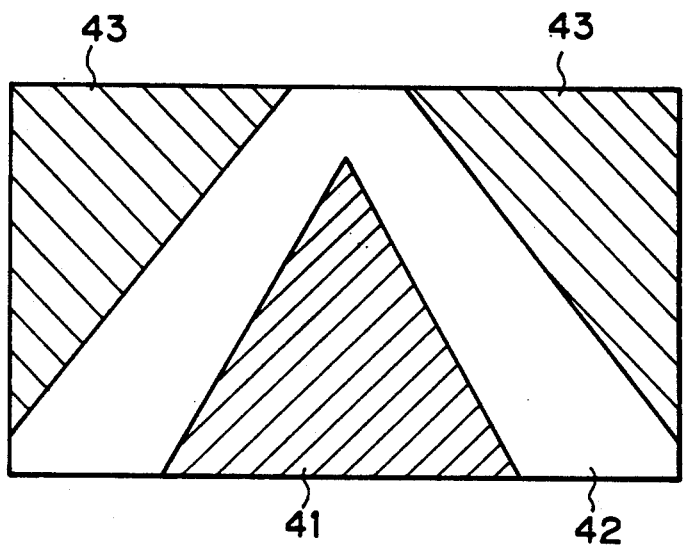
FIG. 13 is a developed view of the plane electrode of the electron emission element formed on the inner wall of the hole of the second embodiment of the present invention.

It is to be noted that the electrodes 41 and 43 may be formed by patterning the electrodes as illustrated in FIGS. 12 and 13.

Next, a method for producing the electron emission elements integrated substrate according to the second embodiment of the present invention is described hereinafter.

First, the substrate 11 is formed in the way similar to that of the first embodiment and the diameter of the through-hole 11a of the substrate 11 is widened to about 0.3 μm, for instance.

Figure 14:
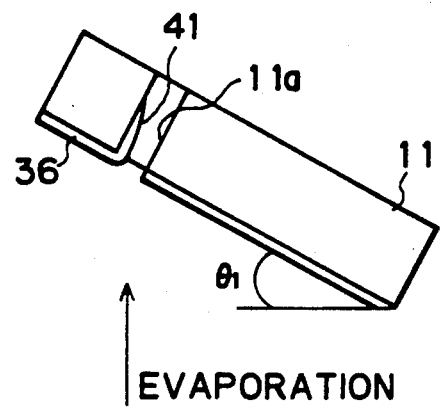
FIG. 14 is an explanatory view for explaining the process for producing the electron emission electrode of the element of FIG. 10.

After that, the substrate 11 is inclined by an angle $\theta_1$ as illustrated in FIG. 14. In this state, a predetermined pattern of the electrodes is formed by an evaporation method from one side of the substrate 11 with the use of tungsten, for instance, which has a low job function so as to form the lines 35 in one side of the substrate 11 and simultaneously therewith the electrode 41 at a part in the through-hole 11a as well by evaporating the material.

Figure 15:
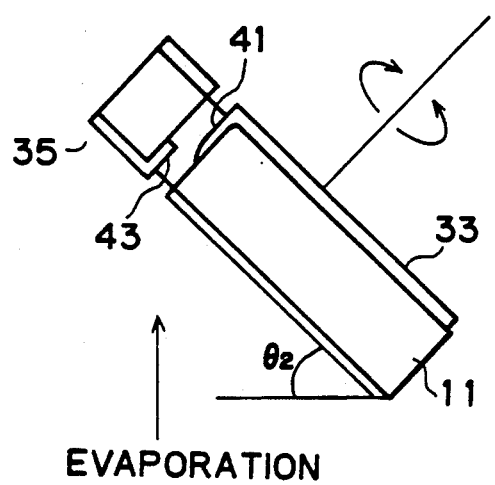
FIG. 15 is an explanatory view for explaining the process for producing the electron drawing electrode of the element of FIG. 10.

After that, the substrate 11 is reversed upside down and inclined by an angle $\theta_2$, as illustrated in FIG. 15. In this state, the substrate 11 is rotated within a predetermined rotational angle range uncovering the portion of the electron outlet 43a. During the rotation of the substrate 11 in this state, gold or aluminum is evaporated to form a thin film on the lower surface of the substrate 11 in FIG. 15 so that the common line 36 of the electron emission electrodes is formed on the substrate 11 and that the electrode 43 is simultaneously formed at a part of the inner wall of the through-hole 11a as well.

It is to be noted that the part of the inner wall where the electrode 43 is formed is strictly different and separated from the part where the electrode 41 is already formed so as to avoid short circuit between the electrodes 41 and 43. For this purpose, it is necessary to arrange very carefully the inclination angles $\theta_1$ and $\theta_2$ and the rotational position of the substrate 11.

In the above mentioned particular embodiment of the present invention, the angle $\mu_2$ of FIG. 15 is larger than the angle $\theta_1$ of FIG. 14 so that protruding depth of the electrode 43 in the hole 37 (the length of the electrode 43 along the hole 37) is less than the protruding length of the electrode 41 in the hole 37, as illustrated in FIG. 9.

Figure 16:
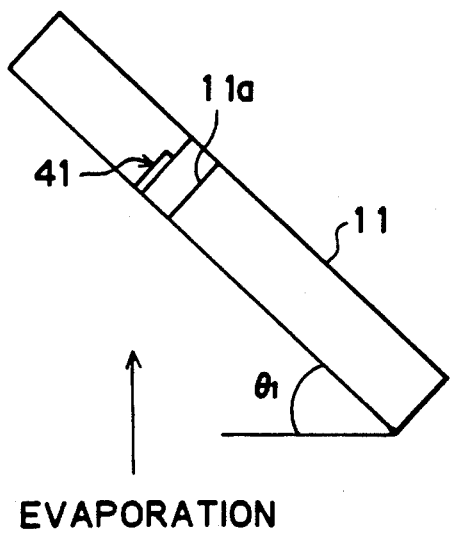
FIG. 16 is an explanatory view for explaining the process for producing the electron emission electrode of the element illustrated in FIGS. 12 and 13.
Figure 17:
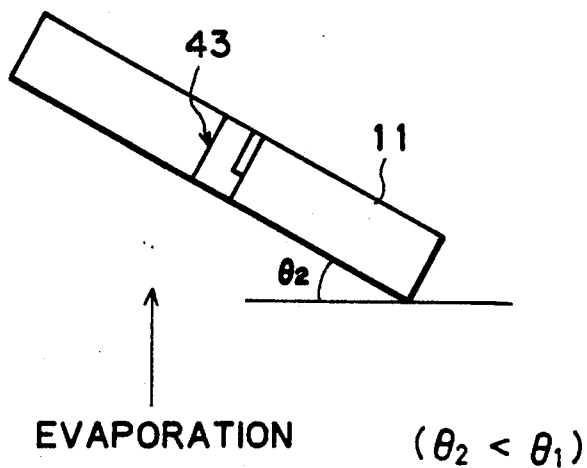
FIG. 17 is an explanatory view for explaining the process for producing the electron drawing electrode of the element illustrated in FIGS. 12 and 13.

Or otherwise, the angle $\theta_1$ may be arranged larger than the angle $\theta_2$ in the evaporation process, as illustrated in FIGS. 16 and 17, instead of the arrangement of FIGS. 14 and 15 mentioned above. In this case, by conducting the evaporation process without rotating the substrate 11, the electrode pattern of FIGS. 12 and 13 can be obtained.

As mentioned above, in accordance with the second embodiment of the present invention, the element 40 is formed along the inner wall of each hole 17 formed in the substrate 11 which is constituted from an anodized film, which enables to obtain the same advantages as the first embodiment mentioned before.

Besides, the element 40 is constructed from the plane type electrodes 41 and 43 being rolled, which makes the structure compact and enables to form the electrodes 41 and 43 by the evaporation process without using the photo process at the time of producing the element, thereby reducing the cost thereof.

Figure 18:
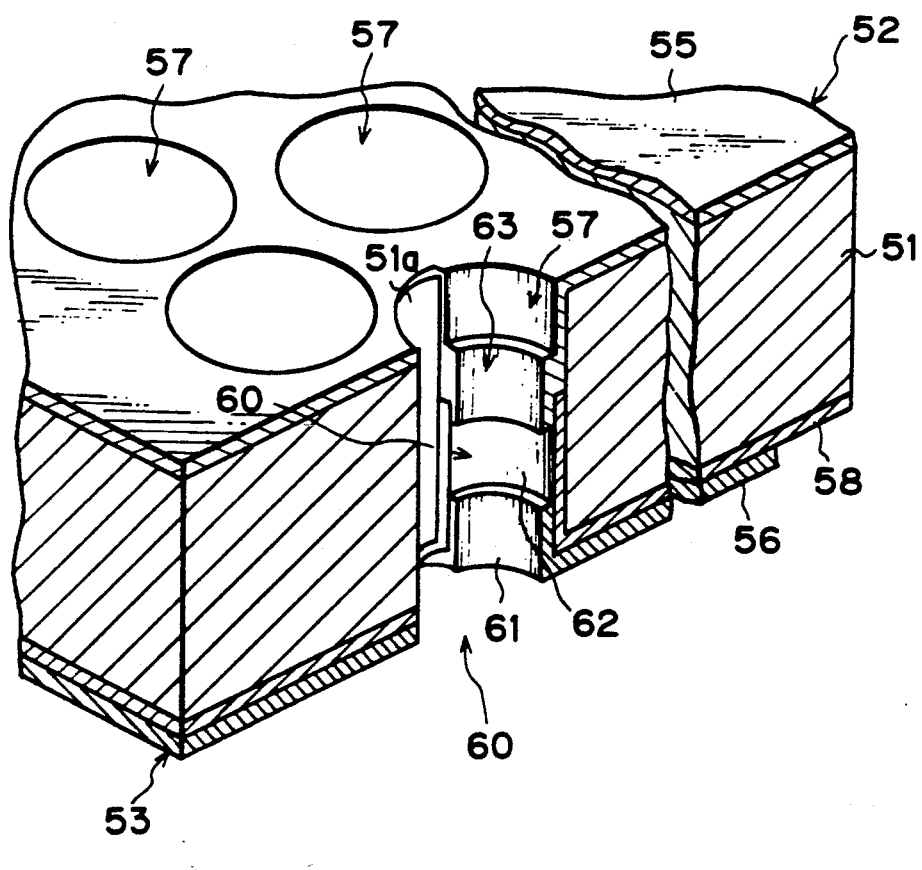
FIG. 18 is a perspective view of the electron emission elements integrated substrate in accordance with the third embodiment of the present invention.
Figure 19:
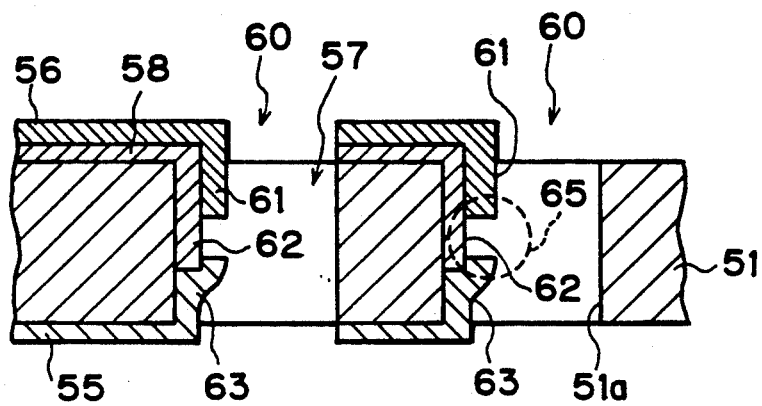
FIG. 19 is an enlarged sectional view of the electron emission element of the third embodiment of the present invention.
Figure 20:
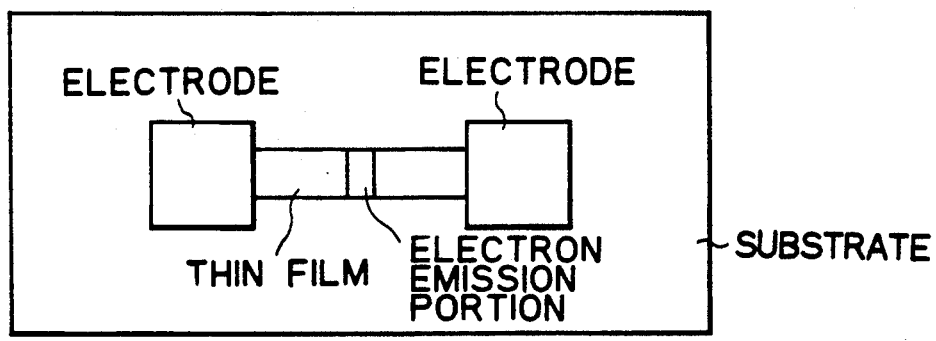
FIG. 20 is an explanatory view for explaining the function of the element of the third embodiment of the present invention.

A third embodiment of the electron emission elements integrated substrate in accordance with the present invention is illustrated in FIGS. 18 to 20.

It is to be noted that the same or corresponding parts are designated by the same numerals as the embodiments mentioned above and the explanation thereof are deleted.

The electron emission elements integrated substrate according to the third embodiment comprises, as illustrated in FIGS. 18 and 19, a substrate 51 made from an electrically insulating member such as ceramic and two wiring layers 52 and 53 disposed on both of the upper and lower sides of the substrate 51. The layers 52 and 53 have shapes similar to those of the layers 12 and 13. One of the layers, for example, the upper layer 52 in FIG. 18 is made from aluminum (Al), for instance, and comprises a plurality of electron drawing common electrode lines 55 disposed side by side separated from each other and in parallel to each other. Also, the other of the layers, i.e., the lower layer 53 in FIG. 18 is made from aluminum, for instance, and comprises a plurality of electron emission common electrode lines 56 disposed side by side separated from each other in parallel to each other and perpendicular to the lines 55 formed on the other side of the substrate.

Each of the lines 55 and 56 has a predetermined width so that a predetermined area of the upper line 55, for instance, crosses over the lower line 56, sandwiching the substrate 51 between the lines 55 and 56. In this sandwich area, a carbon layer 58 is disposed between the substrate 51 and the line 56. Also, in this sandwich area, a plurality of minute holes 57 are formed along the direction of the thickness of the substrate penetrating through the sandwich structure. An electron emission element 60 is arranged at a part of or over a whole part of the inner wall of each minute hole 57, as described later.

The element 60 is formed on the inner wall of each hole 57 along the hole direction and comprises an electron emission electrode 61, an electron drawing electrode 63 and a conductive layer 62.

The electrode 61 is made from aluminum (Al), for instance, and protrudes from the line 56 formed on one of the sides of the substrate 51 into the hole 57 toward the line 55 formed on the other side of the substrate 51 along the through-hole 51a of the substrate.

The electrode 63 is made from aluminum (A1), for instance, and protrudes from the line 55 formed on one of the sides of the substrate 51 into the hole 57 toward the line 56 formed on the other side of the substrate 51 along the through-hole 51a of the substrate 51.

The layer 62 is formed by a heat treatment of the carbon layer 58 and extends from the carbon layer 58 toward the line 55 beyond the electrode 61 into behind the protruding end of the electrode 63.

That is, the element 60 has essentially a surface conductive type electron emission element structure, as illustrated in FIG. 20. In accordance with the structure of the element 60, electrons are emitted from an electron emission portion 65 (FIG. 19) where the electrodes 61 and 63 are arranged close to each other on the layer 62.

A method for producing the above mentioned third embodiment of the present invention is described below.

First, the substrate 51 is made in such a way that a ceramic plate having a predetermined size is prepared and that a plurality of minute through-holes 51a are formed at predetermined constant intervals in the plate by a laser process.

After that, the substrate 51 is in? lined by a predetermined angle, as in the case of the above mentioned embodiments. In this state, the carbon layer constituting the layers 58 and 62 is formed on one of the sides of the substrate 51 by evaporating or sputtering carbon from that side of the substrate 51.

After that, the inclination angle of the substrate 51 is increased. In this state, aluminum is evaporated or sputtered on the carbon layer 58 to form the electrode line 56 on the layer 58 and simultaneously therewith the electrode 61 as well at a part of the inner wall in each of the holes 51a of the substrate.

After that, the substrate 51 is turned over and aluminum is evaporated onto the other side opposite to the carbon layer side of the substrate to form the line 55 on the other side surface of the substrate and simultaneously therewith the electrode 63 as well at the other part of the inner wall of each hole 51a of the substrate 51.

It is to be noted that the part where the electrode 63 is formed is strictly different and separated from the part where the electrode 61 is already formed on the inner wall of each hole 51a so as to avoid short circuit between the electrodes 61 and 63. For this purpose, it becomes necessary to very carefully arrange the inclination angle of the substrate 51 and the rotational position thereof at the time of conducting the evaporation process for forming the electrode 63 at a predetermined desired position.

After that, the substrate undergoes a heat treatment to form the conductive layer 62, thereby the electron emission portion 65 is formed.

As mentioned above, in accordance with the third embodiment of the present invention, the element 60 is formed along the inner wall of each minute hole 57 of the substrate 51, which makes it possible to effectively use almost a whole surface of the substrate 51 for wiring arrangement so that a high integrated substrate for electron emission elements can be obtained.

Besides, the element 60 formed along the inner wall of the hole 57 is constituted from the surface conductive type structure, which makes it possible to easily form the element 60 in the hole 57 by a simple process for forming the films as mentioned above, enabling to reduce the producing cost thereof.

The fourth embodiment of the present invention is illustrated in FIGS. 21 to 24.

It is to be noted that the same or corresponding parts are designated by the same numerals as the embodiments mentioned above and the explanation thereof are deleted.

Figure 21:
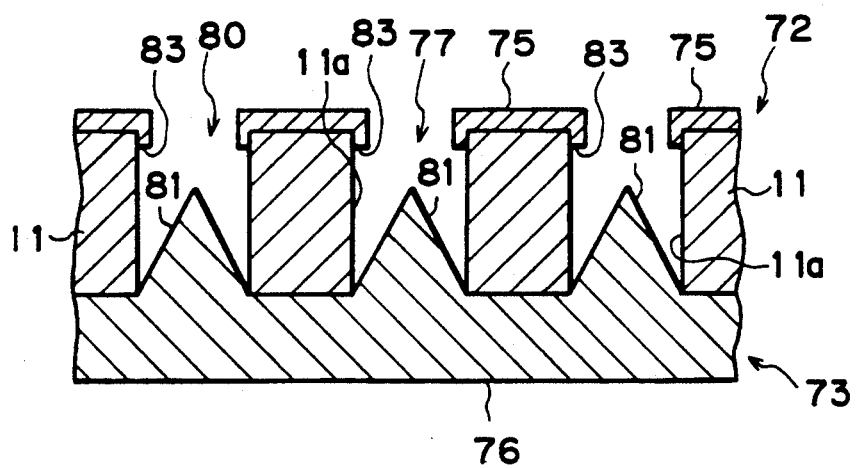
FIG. 21 is an enlarged sectional view of a main portion of the electron emission elements integrated substrate in accordance with the fourth embodiment of the present invention.

The electron emission elements integrated substrate in accordance with the fourth embodiment of the present invention comprises, as illustrated in FIG. 21, an anodized film substrate 11 formed by an anodic oxidization process and two wiring layers 72 and 73 formed on both of the sides of the substrate 11. The through-holes 11a formed in the substrate 11 may not necessarily be widened through a widening process as was the case of the embodiments mentioned before. Also, the layers 72 and 73 have shapes similar to those of the layers 12 and 13 of the first embodiment, respectively.

The layer 72 is made from gold (Au) and comprises a plurality of electron drawing common electrode lines 75 formed side by side separated from each other and in parallel to each other.

The layer 73 is made from gold (Au), for instance, and comprises a plurality of electron emission common electrode lines 76 formed side by side separated from each other and in parallel to each other and perpendicular to the lines 75.

Each of the perpendicularly crossing lines 75 and 76 has a predetermined width so that a predetermined area of the upper line 75 (FIG. 21) crosses over the lower line 76 sandwiching the substrate 11 between the electrode lines 75 and 76.

A plurality of minute holes 77 are formed in the substrate 11 in the direction of thickness of the substrate. An electron emission element 80 for emitting electrons is formed in each hole 77 at a part of or over a whole of the inner wall of the hole.

Each element 80 formed in the hole 77 comprises a conical electron emission electrode 81 made from gold (Au), for instance, protruding from the line 76 toward the line 75 in the hole 11a of the substrate 11 along the direction of the hole 11a and an electron drawing electrode 83 made from gold (Au), for instance, protruding from the line 75 toward the line 76 in the hole 11a of the hole 11 along the direction of the hole 11a to the position close to the electrode 81.

In accordance with the arrangement mentioned above, electrons are emitted by field emission (cold cathode discharge function) when a predetermined voltage is applied between the electrodes 81 and 83.

A method for producing the integrated substrate in accordance with the fourth embodiment of the present invention is described below.

Figure 22A:
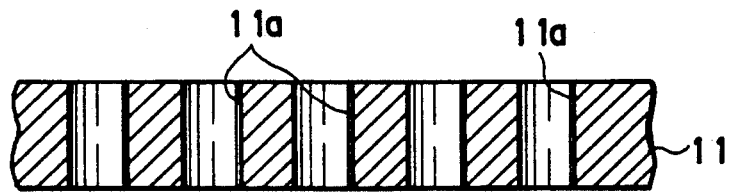
FIGS. 22a to 22d are explanatory views for explaining the process for producing the electron emission electrode by burying metal in the minute hole of the substrate in accordance with the fourth embodiment of the present invention.

First, as illustrated in FIG. 22a, the substrate 11 having a plurality of through-holes 11a formed therein is made by the same way as the first embodiment. It is noted however that the process for making the substrate 11 does not include the hole widening process for widening the diameter of the through-hole 11a which process was included in the case of the first embodiment mentioned before.

Figure 22B:
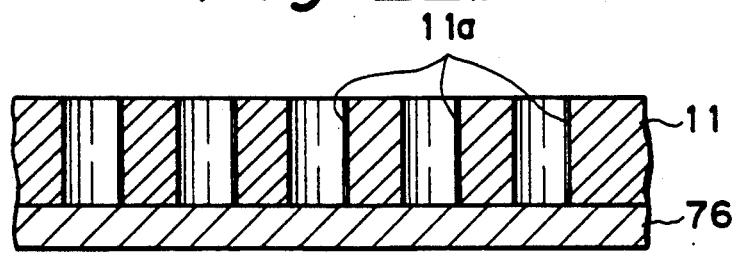

After that, as illustrated in FIG. 22b, gold is sputtered on one of the sides of the substrate 11 to form a film of the line 76.

Figure 22C:
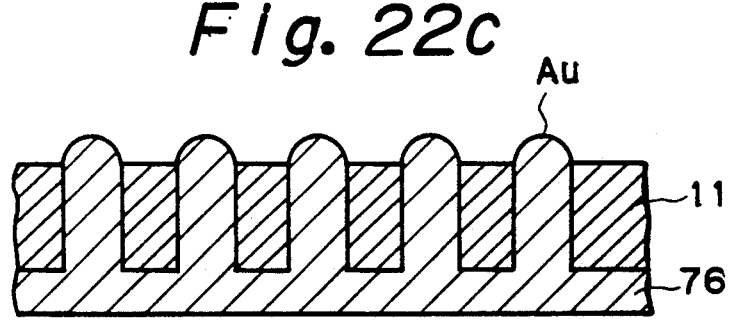

After that, as illustrated in FIG. 22c, each of the holes 11a is filled with gold (Au) by an electrolytic deposition process using the electrode line 76 as the cathode. The electrolytic deposition process is carried out under the condition, for instance, that the current density is 0.1 to 15 A/dm$^2$, the electrolyte temperature is 40° to 70° C. and the electrolyting time is 10 to 120 minutes.

Figure 22D:
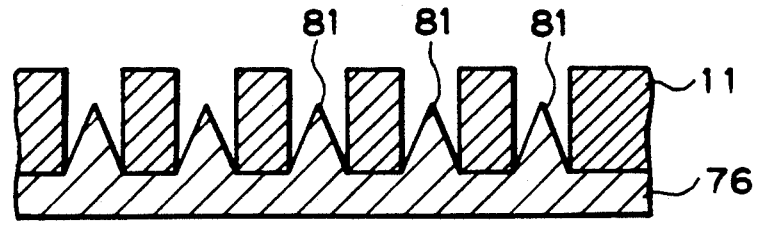
Figure 23:
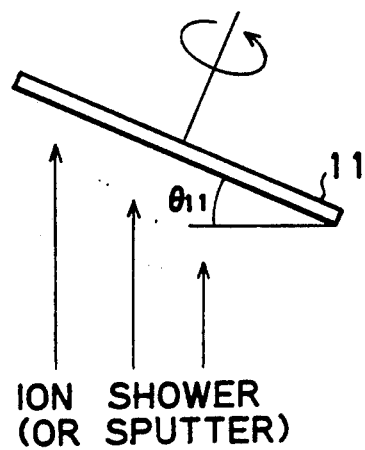
FIG. 23 is an explanatory view for explaining the process for forming the electron emission electrode from the metal buried in the hole according to the process of FIGS. 22a to 22d.

After that, as illustrated in FIG. 23, the substrate 11 is inclined by a predetermined angle $\theta_{11}$ between 10 to 45 degrees, for instance and rotated in this inclined state. While rotating the substrate 11, ion beam is applied to the substrate 11 from the side opposite to the line 76 side to etch or mill the gold filled in the holes 11a of the substrate 11 so that a sharp conical electrode 81 is formed in each of the holes, as illustrated in FIG. 22d. It is to be noted that in this process for forming the conical electrodes 81, the substrate 11 itself functions as the mask for the ion beam process.

Figure 24:
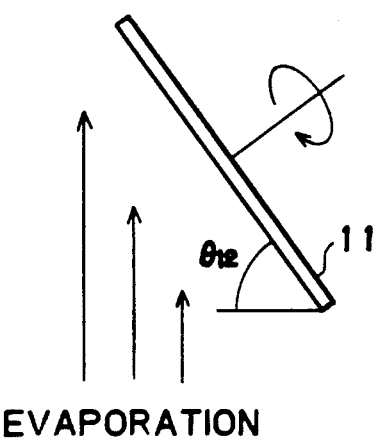
FIG. 24 is an explanatory view for explaining the process for forming the electron drawing electrode of the fourth embodiment of the present invention.

After that, as illustrated in FIG. 24, the substrate 11 is further inclined to a larger angle $\theta_{12}$ than the angle in the above mentioned ion beam etching or ion beam milling process and rotated in the state. While rotating the substrate, gold is evaporated onto the substrate from the other side of the substrate 11 so that the lines 75 are formed on the substrate 11 and simultaneously therewith the electrode 83 (FIG. 21) is formed in each hole 11a at a part thereof.

The reason why the inclination angle of the substrate 11 in the evaporation process is arranged larger than the angle in the ion beam etching process is to keep the electrode 83 disconnected from the electrode 81 already formed in the hole 11a and avoid short circuit between the electrodes 81 and 83.

As mentioned above, in accordance with the fourth embodiment of the present invention, a number of the electron emission elements 80 each having an electrode 83 are formed along the inside walls of the holes 17 formed in the substrate 11 in a state of three-dimensional arrangement, and besides, the substrate 11 is constituted from an anodized film, which makes it possible to obtain the same advantages as the first embodiment mentioned before.

Further, the element 80 comprises the conical electrode 81 and the electrode 83 formed in the hole 77 along the hole direction and arranged close to the conical electrode 81, which makes it unnecessary to use the photo process for forming the element 80 as a result of which the cost for producing the integrated substrate can be reduced.

Figure 25:
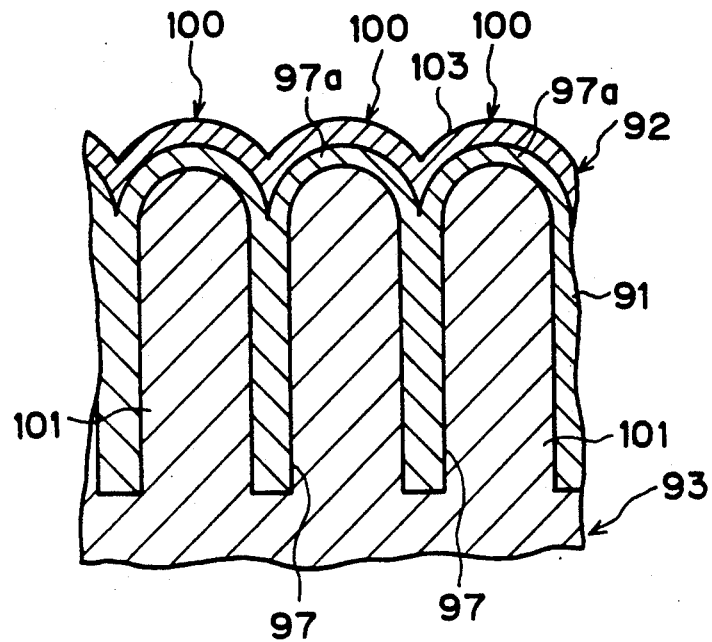
FIG. 25 is an enlarged sectional view of a main portion of the electron emission elements integrated substrate in accordance with the fifth embodiment of the present invention.

FIG. 25 illustrates a fifth embodiment of the present invention.

It is to be noted that the same or corresponding parts are designated by the same numerals as the above mentioned embodiments and explanation thereof are deleted.

The electron emission elements integrated substrate in accordance with the fifth embodiment comprises, as illustrated in FIG. 25, a substrate 91 composed of an anodized film made from aluminum oxide ($Al_2O_3$), for instance, and two wiring layers 92 and 93 formed on both of the upper and lower surface of the substrate 91.

The layer 92 is made from gold (Au), for instance, and constitutes a common electrode line for drawing electrons. The layer 93 is made from aluminum (Al), for instance, and constitutes a common electrode line for emitting electrons.

Also, the substrate 91 has a plurality of minute holes 97 formed therein, each hole having a bottom 97a being closed. Each hole 97 is filled with the same metal as the layer 93 constituting a pin like electron emission electrode 101 protruding from the layer 93 toward the layer 92. The above mentioned structure constitutes an electron emission element 100 formed in the entire portion of each of the plurality of the holes 97 formed in the substrate 91.

The element 100 comprises the pin-like electron emission electrode 101 made from aluminum (Al), for instance, extruding from the layer 93 toward the layer 92 along the direction of each hole 97 formed in the substrate 91 and the electron drawing electrode 103 made from gold (Au), for instance, disposed over the bottom 97a of the hole 97a formed in the substrate 91. The electrodes 101 and 103 are disconnected from each other by the insulating bottom wall 97a disposed therebetween. This portion constitutes an electron emission portion. That is, the element 100 of the embodiment mentioned above is constituted from an MIM (Metal Insulator Metal) type electron emission element comprising the layers 101, 91(97a) and 103 disposed side by side adjacent to each other along the direction of the hole 97.

It is to be noted that in the case where the substrate 91 is made from an anodized film which has a number of minute holes 97 formed therein, it may be arranged in such a way that a group of holes 97 is selectively filled with elements 101 so that the portion outer the area where the elements 101 are filled is considered to constitute one minute hole.

Next, a method for producing the above mentioned fifth embodiment of the present invention is described below.

First, the substrate 91 is made as follows. an aluminum plate of 10 to 100 μm thick which is not shown is anodized in sulfuric acid solution of 10% applying voltage of 20V.

After that, the substrate is kept being in the sulfuric acid solution for 5 to 60 minutes so that the bottom portion of each of the holes 97 is thinned from the inside thereof.

After that, the substrate is anodized in boric acid solution applying voltage of 10V or less so as to arrange the thickness of the bottom portion of each hole 97 as being of about 10 nm thick.

After that, aluminum is sputtered in the hole 97 from the opening side thereof so as to form the pin like electrode 101 made from aluminum in the hole 97. It is to be noted that the bottom portion of the hole 97 has a substantially semi-spherical shape to constitute a semi-spherical tip of the electrode 101 of less than 50 nm diameter, which makes it possible to effectively concentrate the electric charges at the tip.

After that, the substrate 91 is covered by a glass plate from the hole opening side thereof and bathed in hydrochloric acid solution to remove aluminum from the outside of the bottom wall 97a of each hole 97 of the substrate 91.

After that, gold film 103 of about 8 to 30 nm thick is formed on the outer side of the bottom wall 97a to constitute an MIM type element 100 comprising the electrodes 101 and 103, and the insulating bottom wall 97a.

As mentioned above, in accordance with the fifth embodiment of the present invention, the structure of the integrated substrate is arranged in such a way that the electrode 101 is formed in the hole 97 along the direction of the hole formed in the substrate 91 so that a number of elements 100 are three-dimensionally arranged in the substrate and that the substrate 91 is made from an anodized film, which enables to obtain the same advantages as the first embodiment of the present invention.

Besides, the electrode 101 of the element 100 is formed as a pin shape, which effectively concentrates the electric field at the tip of the pin so that the electric discharge efficiency of the element is heightened.

It is to be noted that instead of the above mentioned arrangement wherein the electrode 101 is made from aluminum as the layer 93, the electrode 101 may be made from other metal, nickel (Ni), for instance. In that case, the layer 93 may be made from gold (Au). Such a structure can be produced in such a way that an aluminum substrate of 10 to 100 μm thick is anodized in sulfuric acid solution of 10% applying voltage of 20V after that the substrate is kept being in the solution for 5 to 60 minutes so that the bottom portion of each hole 97 is thinned especially from inside thereof so that the hole 97 is filled with nickel (Ni) by electrolytic deposition effect. After that, gold or aluminum is sputtered onto the substrate from the hole opening side and a predetermined pattern is formed by a photo process. After that, in a state where the hole opening side of the substrate 91 is being covered by a glass plate, aluminum and anodized alumina are removed from the other side of the substrate with the use of phosphoric acid solution. After that, an insulating alumina film (i.e., bottom wall portion 97a) of about 10 nm thick is formed by a CVD process and a film of gold (Au) is formed on the insulating film so as to constitute the electrode 103. It is to be noted that instead of the CVD process, a sputtering process may be adopted so that the sputtered film is anodized in boric acid to form a barrier layer.

Figure 26:
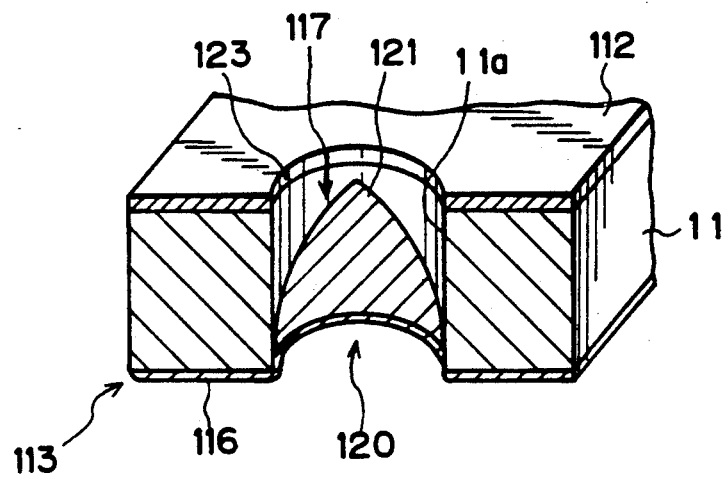
FIG. 26 is an enlarged perspective view of a main portion of the electron emission elements integrated substrate in accordance with the sixth embodiment of the present invention representing an inner side of a hole formed in the substrate.
Figure 27:
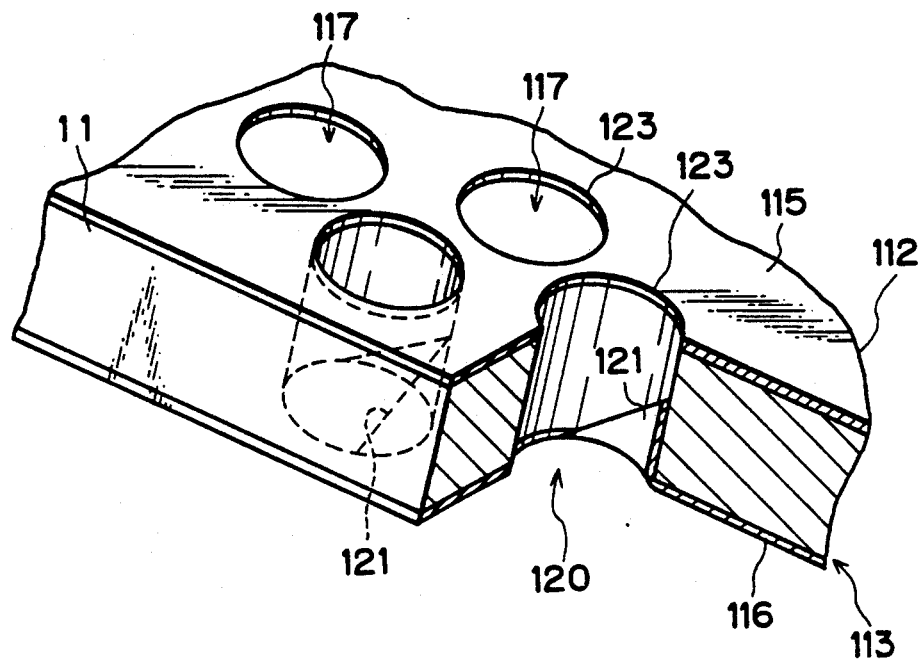
FIG. 27 is a perspective view of the substrate in accordance with the sixth embodiment of the present invention.

A sixth embodiment of the present invention is illustrated in FIGS. 26 and 27.

It is to be noted that the same or corresponding parts are designated by the same numerals as the embodiments mentioned above and the explanation thereof are deleted.

The electron emission elements integrated substrate in accordance with the sixth embodiment of the present invention comprises, as illustrated in FIGS. 26 and 27, a substrate 11 and two wiring layers 112 and 113 disposed on both of the upper and lower sides of the substrate 11. The layers 112 and 113 have shapes similar to those of the layers 12 and 13 of the first embodiment, respectively.

The layer 112 is made from gold (Au) or aluminum (Al), for example, and comprises a plurality of electron drawing common electrode lines 115 disposed side by side separated from each other and in parallel to each other.

The layer 113 is made from tungsten, for example, and comprises a plurality of electron emission common electrode lines 116 disposed side by side separated from each other and in parallel to each other and perpendicular to the lines 115.

Further, each of the lines 115 and 116 has a predetermined width so that a predetermined area of one line crosses over the other line sandwiching the substrate 11 between the lines 115 and 116.

A plurality of minute holes 117 are formed in the substrate 11 at the sandwiching area penetrating through the lines 115 and 116 and the substrate 11 in the direction of the substrate thickness. A plane type electron emission element 120 is arranged at a part of the inside wall of each of the holes 117.

The element 120 formed along the inside wall of the hole 117 comprises an electron emission electrode 121 and an electron drawing electrode 123. The electrode 121 is made from tungsten, for instance, and patterned to form a protruding shape extending from the line 116 toward the line 115 along the inside wall of the through-hole 11a of the substrate 11. The electrode 123 is formed as a part of the line 115 and constitutes a part of the inside wall of the hole 11a of the substrate 11.

A method for producing the above mentioned sixth embodiment of the present invention is described below.

First, by the same way as the embodiments mentioned before, the substrate 11 is formed and each hole 11a of the substrate 11 is widened to about 0.3 μm diameter.

After that, the substrate 11 is inclined by an angle $\theta 1$, as illustrated in FIG. 14. In this inclined state of the substrate 11, a low work function metal such as tungsten is evaporated onto the substrate 11 from one side thereof to form the lines 116 on the side and at the same time the electrode 121 at a part of the inside wall of the hole 11a as well.

After that, the substrate 11 is turned over upside down and held horizontally without being inclined. In this state, a metal such as aluminum is sputtered onto the substrate 11 from the other side thereof to form the lines 115. After that, the electrode side is covered by a dry film resist or a masking tape so as to remove unnecessary aluminum from the portion corresponding to the portion of the bottom wall of the hole 11a so that the electrode 123 is formed in the hole.

As mentioned above, in accordance with the sixth embodiment of the present invention, the element 120 is formed along the inside wall of each of the holes 117 formed in the substrate 11 which is constituted from an anodized film, which enables to obtain the same advantages as the embodiments mentioned before.

Besides, the element 120 is formed as a patterned film having a predetermined shape arranged along the inside wall of the hole 117 of the substrate 11, which simplifies the structure of the electrodes 121 and 123 and makes it possible to reduce the cost for producing the device.

Figure 28:
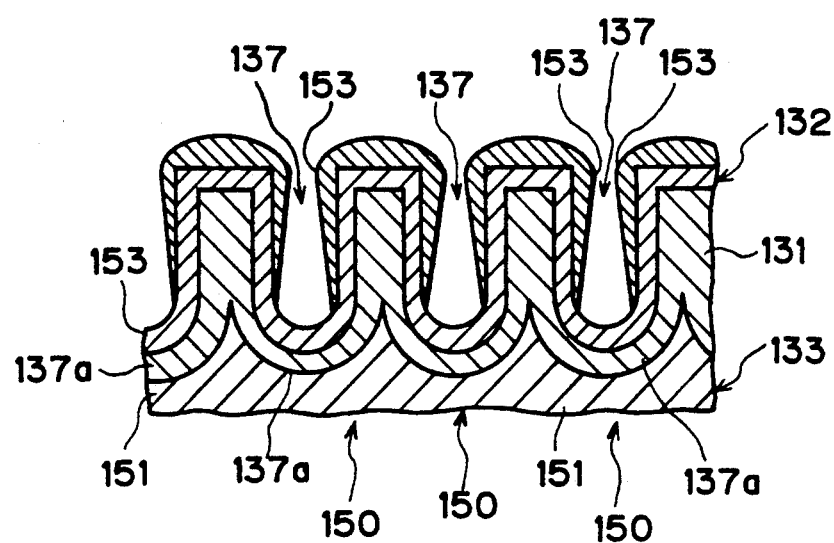
FIG. 28 is a sectional view of a main portion of the electron emission elements integrated substrate in accordance with the seventh embodiment of the present invention.

FIG. 28 illustrates a seventh embodiment of the present invention.

It is to be noted that the same or corresponding parts are designated by the same numerals as the embodiments mentioned before and the explanation thereof are deleted.

The electron emission elements integrated substrate in accordance with the seventh embodiment of the present invention comprises, as can be seen from FIG. 28, a substrate 131 made from an electrically insulating member such as aluminum oxide ($Al_2O_3$) which is treated by an anodic oxidization process and two wiring layers 132 and 133 arranged on both of the upper and lower surfaces of the substrate 131. A whole view of the layers 132 and 133 is not illustrated in the drawing.

The layer 132 is made from gold (Au), for instance, and constitutes an electron drawing common electrode line.

The layer 133 is made from aluminum (Al), for instance, and constitutes an electron emission common electrode line.

Also, the substrate 131 has a plurality of minute holes 137 each of which has a bottom wall 137a.

An electron emission element 150 is formed using the entire inside wall of each hole 137 formed in the substrate 131.

The element 150 comprises an electron emission electrode 151 made from aluminum, for instance, and an electron drawing electrode 153 made from gold, for instance. The electrode 151 is disposed along and over the bottom walls 137a of the holes 137 formed in the substrate 131. The electrode 153 is disposed along the inside wall of each hole 137 of the substrate 131 extending from the layer 132 toward the layer 133.

An electron emission element 150 is constituted from the electrodes 151 and 153 and the thin insulating bottom wall 137a interposed between the electrodes 151 and 153. That is, the element 150 is arranged as an MIM (Metal Insulator Metal) type element constituted from the layers 151, 131(137a) and 153 which are disposed side by side along the direction of the hole 137.

A method for producing the above mentioned seventh embodiment of the present invention is described below.

First, the substrate 131 is formed in a way as follows. An aluminum substrate of 10 to 100 μm thick is anodized in sulfuric acid solution of 10% applying voltage of 20V.

After that, the substrate is kept being in the sulfuric acid solution for 5 to 60 minutes to thin the bottom wall portions of the holes 137 especially from inside thereof. The substrate is anodizes in boric acid solution under voltage of 10V or less so as to thin the insulating bottom wall of the hole 137 to about 10 nm thick.

After that, gold (Au) is sputtered onto the substrate from the hole opening side thereof to form the electrode 153 on the side along the hole 137.

After that, the hole opening side of the substrate is covered by a glass plate and the substrate is treated in hydrochloric acid solution to remove aluminum from the bottom wall portion side of the hole 137.

After that, an aluminum film of predetermined thick is formed on the hole bottom wall 137a to constitute the MIM type element 150 comprising the electrodes 151, 153 and the wall 137a.

As mentioned above, in accordance with the seventh embodiment of the present invention, the electrodes 153 are formed along the inside walls of the minute holes 137 formed in the substrate 131 so that a number of elements 150 are arranged three dimensionally in and on the substrate 131 and besides the substrate 131 is constituted from an anodized film, which enables to obtain the same advantages as the embodiments mentioned before.

It is an advantage of the present invention that due to the arrangement wherein the electron emission element is formed along the inner wall of the minute hole of the substrate, as realized by an embodiment of the present invention, it becomes possible to effectively use an entire surface of the substrate for wiring, which makes it possible to realize a high integrated substrate.

It is another advantage of the present invention that due to the arrangement wherein the substrate is made from an anodized film, as realized by another embodiment of the present invention, it becomes possible to make the diameter of the hole very small and shorten the pitch length of the holes, which makes it possible to realize a high integrated substrate and reduce the cost thereof as well.

It is still another advantage of the present invention that due to the arrangement wherein the metal-insulator-metal type electron emission element is formed along the inner wall of the minute hole, as realized by still another embodiment of the present invention, it becomes unnecessary to use a photo-process for forming the electron emission element, which makes it possible to reduce the cost of production.

It is a further advantage of the present invention that due to the arrangement wherein the electron emission element comprises a plane electrode for electron emission and an electron drawing electrode, as realized by a further embodiment of the present invention, it becomes possible to realize a very simplified structure of the element and reduce the cost thereof as well.

It is a still further advantage of the present invention that due to the arrangement wherein the surface conductive type electron emission element is formed along the inner wall of the minute hole, as realized by a still further embodiment of the present invention, it becomes possible to easily form the element on the inner wall of the minute hole.

It is a still further advantage of the present invention that due to the arrangement wherein the electron emission element formed along the inner wall of the minute hole comprises a conical electron emission electrode and an electron drawing electrode, as realized by a still further embodiment, it becomes possible to form the element without using the photo-process, which makes it possible to reduce the production cost of the element.

It is a still further advantage of the present invention that due to the arrangement wherein a pin-like electrode is formed along the inner wall of the minute hole, as realized by a still further embodiment of the present invention, the electric field is concentrated around the pin, which raises the electron emission efficiency.

It is a still further advantage of the present invention that due to the arrangement wherein the electron emission electrode is patterned along the inner wall of the minute hole of the substrate, as realized by a still further embodiment of the present invention, the electrode structure becomes very simplified and the production cost thereof becomes inexpensive as well.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electron emission elements integrated substrate comprising:
    a film having a plurality of minute holes formed therein, each hole extending in a direction of thickness of said substrate; and
    an electron emission element arranged in said each hole, said element comprising a first electrode, a second electrode and an insulating member disposed between said first and second electrodes.

2. An electron emission elements integrated substrate according to claim 1, wherein said film is constituted from an anodized film having a plurality of minute holes formed therein.

3. An electron emission elements integrated substrate according to claim 1, wherein said element is formed as a metal-insulator-metal type electron emission element.

4. An electron emission elements integrated substrate according to claim 1, wherein said element comprises a plane type electron emission electrode and a plane type electron drawing electrode.

5. An electron emission elements integrated substrate according to claim 1, wherein said element is formed as a surface conductive type electron emission element.

6. An electron emission elements integrated substrate according to claim 1, wherein said element comprises an electron drawing electrode formed along an inside wall of said minute hole and a conical electron emission electrode disposed in the vicinity of a said electron drawing electrode.

7. An electron emission elements integrated substrate according to claim 1, wherein said element comprises a pin-like electrode formed in said minute hole.

8. An electron emission elements integrated substrate according to claim 1, wherein said electron emission electrode is patterned on an inside wall of said minute hole formed in said film.

9. An electron emission elements integrated substrate according to claim 1, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

10. An electron emission elements integrated substrate according to claim 2, wherein said element is formed as a metalinsulator-metal type electron emission element.

11. An electron emission elements integrated substrate according to claim 2, wherein said element comprises a plane type electron emission electrode an a plane type electron drawing electrode.

12. An electron emission elements integrated substrate according to claim 2, wherein said element is formed as a surface conductive type electron emission element.

13. An electron emission elements integrated substrate according to claim 2, wherein said element comprises an electron drawing electrode formed along an inside wall of said minute hole and a conical electron emission electrode disposed in the vicinity of said electron drawing electrode.

14. An electron emission elements integrated substrate according to claim 2, wherein said element comprises a pin-like electrode formed in said minute hole.

15. An electron emission elements integrated substrate according to claim 2, wherein said electron emission electrode is patterned on an inside wall of said minute hole formed in said film.

16. An electron emission elements integrated substrate according to claim 2, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

17. An electron emission elements integrated substrate according to claim 3, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

18. An electron emission elements integrated substrate according to claim 4, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

19. An electron emission elements integrated substrate according to claim 5, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

20. An electron emission elements integrated substrate according to claim 6, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

21. An electron emission elements integrated substrate according to claim 7, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

22. An electron emission elements integrated substrate according to claim 8, wherein said film has a plurality of first common electrode lines formed on an upper side thereof disposed in parallel to each other and a plurality of second common electrode lines formed on a lower side thereof disposed in parallel to each other and perpendicular to said first lines, said first electrode being connected to said first common line and said second electrode being connected to said second common line, respectively.

* * * * *